United States Patent [19]
Yokoi et al.

[11] Patent Number: 5,919,092
[45] Date of Patent: *Jul. 6, 1999

[54] MANIPULATOR FOR GAME MACHINE

[75] Inventors: Gunpei Yokoi; Kenichi Sugino, both of Kyoto, Japan

[73] Assignee: Nintendo Co., Ltd., Kyoto-fu, Japan

[ * ] Notice: This patent is subject to a terminal disclaimer.

[21] Appl. No.: 08/922,368

[22] Filed: Sep. 3, 1997

Related U.S. Application Data

[63] Continuation of application No. 08/509,605, Jul. 31, 1995, Pat. No. 5,820,462, which is a continuation-in-part of application No. 29/030,441, Oct. 31, 1994, Pat. No. Des. 375,326.

[30] Foreign Application Priority Data

Aug. 2, 1994 [JP] Japan ................................. 6-201465

[51] Int. Cl.[6] ..................................................... A63F 9/22
[52] U.S. Cl. ......................... 463/37; 345/169; 273/148 B
[58] Field of Search ........................ 273/148 B; 463/36, 463/46, 47

[56] References Cited

U.S. PATENT DOCUMENTS

D. 316,879   5/1991   Shulman et al. .
D. 317,946   7/1991   Tse .

(List continued on next page.)

FOREIGN PATENT DOCUMENTS 0 470 615 A1   2/1992   European Pat. Off. .
50-22475       3/1975   Japan .
57-18236       1/1982   Japan .
57-2084        1/1982   Japan .
57-136217      8/1982   Japan .

(List continued on next page.)

OTHER PUBLICATIONS

*3D Ballz Instruction Booklet,* Accolade, San Jose, CA, #3050–00231 Rev. Publication Date Unknown. Admitted Prior Art.
6 Photographs of Sony PlayStation: 1) top case and compact disk; 2) hand controller; 3) internal circuit boards (top view); 4) Internal circuit boards (top view); 5) compact disk reader (bottom vew); and internal main circuit board (bottom view). Publication Date Unknown. Admitted Prior Art.
*Nintendo Power,* vol. 31, pp. 74–76, PilotWings article. Copyright 1991.
*Nintendo Power,* vol. 38, p. 25, PilotWings article. Publication Date Unknown. Admitted Prior Art.
*Nintendo Power,* vol. 46, PilotWings article. Publication Date Unknown. Admitted Prior Art.
*Knuckles Chaotix Instruction Manual,* SEGA, Redwood City, California, #84503 (1995).
*Nintendo Power,* vol. 30, p. 22, PilotWings article.
*Nintendo Power,* vol. 31, p. 35, PilotWings article.
*PilotWings Instruction Booklet,* Super Nintendo Entertainment System, SNS–PW–USA, copyright 1991.
*PilotWings, It's a Festival of Flight,* Top Secret Password Nintendo Player's Guide, pp. 82–83 and 160, copyright 1991.

(List continued on next page.)

*Primary Examiner*—Raleigh W. Chiu
*Attorney, Agent, or Firm*—Nixon & Vanderhye PC

[57] ABSTRACT

A manipulator includes a housing having right and left handles, and a coupling for coupling them. The handles are formed with grips, and direction instructing switches for instructing the character moving direction. The switches are disposed in the thumb position area of the player in the upper parts of the grips. A step is formed between the operating regions for forming direction instructing switches and grips, and the thumb of the player draws a spontaneous arc along the step.

25 Claims, 5 Drawing Sheets

U.S. PATENT DOCUMENTS

| | | |
|---|---|---|
| D. 357,712 | 4/1995 | Wu . |
| D. 363,092 | 10/1995 | Hung . |
| D. 375,326 | 11/1996 | Yokoi et al. ............................ D21/48 |
| 4,281,833 | 8/1981 | Sandler et al. . |
| 4,359,222 | 11/1982 | Smith, III et al. . |
| 4,659,313 | 4/1987 | Kuster et al. . |
| 4,817,149 | 3/1989 | Myers . |
| 4,887,966 | 12/1989 | Gellerman . |
| 4,924,216 | 5/1990 | Leung . |
| 4,933,670 | 6/1990 | Wislocki . |
| 4,976,429 | 12/1990 | Nagel . |
| 5,012,230 | 4/1991 | Yasuda . |
| 5,046,739 | 9/1991 | Reichow . |
| 5,052,685 | 10/1991 | Lowe et al. . |
| 5,095,798 | 3/1992 | Okada et al. . |
| 5,203,563 | 4/1993 | Loper, III . |
| 5,207,426 | 5/1993 | Inoue et al. ............................ 463/36 |
| 5,290,034 | 3/1994 | Hineman . |
| 5,436,640 | 7/1995 | Reeves . |
| 5,515,044 | 5/1996 | Glatt . |
| 5,551,693 | 9/1996 | Goto et al. . |
| 5,563,629 | 10/1996 | Caprara . |

FOREIGN PATENT DOCUMENTS

| | | |
|---|---|---|
| 59-40258 | 3/1984 | Japan . |
| 59-121500 | 7/1984 | Japan . |
| 61-16641 | 1/1986 | Japan . |
| 61-198286 | 9/1986 | Japan . |
| 61-185138 | 11/1986 | Japan . |
| 62-269221 | 11/1987 | Japan . |
| 2-41342 | 3/1990 | Japan . |
| 2-68404 | 5/1990 | Japan . |
| 3-16620 | 1/1991 | Japan . |
| 3-248215 | 11/1991 | Japan . |
| 4-26432 | 1/1992 | Japan . |
| 4-20134 | 2/1992 | Japan . |
| 4-42029 | 2/1992 | Japan . |
| 4-104893 | 9/1992 | Japan . |
| 4-291468 | 10/1992 | Japan . |
| 5-100759 | 4/1993 | Japan . |
| 5-19925 | 5/1993 | Japan . |
| 5-177057 | 7/1993 | Japan . |
| 5-241502 | 9/1993 | Japan . |
| 6-23148 | 2/1994 | Japan . |
| 6-54962 | 3/1994 | Japan . |
| 6-68238 | 3/1994 | Japan . |
| 6-110602 | 4/1994 | Japan . |
| 6-114683 | 4/1994 | Japan . |
| 6-190145 | 7/1994 | Japan . |
| 6-190147 | 7/1994 | Japan . |
| 6-205010 | 7/1994 | Japan . |
| 6-285259 | 10/1994 | Japan . |
| 6-315095 | 11/1994 | Japan . |
| 7-104930 | 4/1995 | Japan . |
| 7-222865 | 8/1995 | Japan . |
| 7-288006 | 10/1995 | Japan . |
| 7-317230 | 12/1995 | Japan . |
| 8-45392 | 2/1996 | Japan . |
| 2 244 546 | 12/1991 | United Kingdom . |
| WO 92/09347 | 6/1992 | WIPO . |
| WO 94/12999 | 6/1994 | WIPO . |
| WO97/17651 | 5/1997 | WIPO . |

OTHER PUBLICATIONS

*PilotWings, Soar with the Flight Club,* Super Nintendo Entertainment System Play's Guide, pp. 100–105, copyright 1991.

*Sega Genesis 32X, Instruction Manual,* SEGA, Redwood City, CA, #672–2116 (1994).

*Sega Genesis Instruction Manual,* SEGA, Hayward, California, #3701–926–0–01 (1994).

*Sonic 2 The Hedgehog Instruction Manual,* SEGA, Hayward, California, #672–0944 3701–925–0–01 (1992).

Sony PlayStation Instruction Manual, and informational materials, Sony Computer Entertainment Inc. 1995.

MANIPULATOR FOR GAME MACHINE

This application is a continuation of Ser. No. 08/509,605 filed Jul. 31, 1995 now U.S. Pat. No. 5,820,462, which is a continuation-in-part of Ser. No. 29/030,441 filed Oct. 31, 1994 now U.S. Pat. No. D.375,326.

BACKGROUND OF THE INVENTION

1. Field of the invention

The present invention relates to a manipulator for a game machine, and more particularly to a manipulator for a game machine which is used in a television game machine, a video game machine with display, or the like to which a cartridge storing a game program is detachably attached and which executes the process for the game by reading out the game program from the cartridge.

2. Description of the Prior Art

Manipulators for game machines (so called game controllers) to be used in a television game or the like known hitherto include the joy stick type as disclosed in the Japanese Laid-open patent No. 58-225,515 (corresponding to U.S. Pat. No. 4,414,438; hereinafter called prior art 1), and the joy pad type as disclosed in the Japanese Laid-open Utility Model No. 4-42,029 (corresponding to U.S. Pat No. 5,207,426; hereinafter called prior art 2). In prior art 1, the main body housing is held by a non-dexterous hand, and a control rod (handle) is held by the dexterous hand, and by tilting the wrist in this state, the moving direction of the character is instructed. In prior art 2, on a flat housing that can be held by both hands, a plurality of operation switches for direction instruction and action instruction are arranged.

In prior art 1, in order to manipulate the control rod by tilting the wrist, the main body must be always held stably. However, for use in the game, it is necessary to manipulate action instructing switches for instructing various actions, and usually these switches are provided at the main body side, and are hence manipulated by the hand holding the main body. It is therefore difficult to hold the main body stably while manipulating the action instructing switches, and it is hard to manipulate. If the action instructing switches are provided in the control rod, since the direction is instructed by tilting the wrist, the hand become fatigued after a long use, and the controllability is poor.

In prior art 2, it is designed to be held by both hands, and the operation switches can be manipulated without changing the palm holding state, and the problems in prior art 1 were solved and stable manipulation was possible. However, since the shape is flat, it has few positions to be caught by hand or finger, and it often slips out of hands during operation, or the holding position may be deviated to cause deviation in the configuration of the switches and fingers, and misoperations are likely to occur. It is thus necessary to hold the manipulator correctly on every occasion of misoperation by viewing, and correct the configuration of switches and fingers. As a result, a continuously running game is interrupted, and comfortable manipulation is not obtained. In particular, when used in the game machine with a goggle type display unit, to correct the finger position deviation by viewing the manipulator, the game machine with display unit must be removed from the head, which is very bothersome.

In a controller disclosed in Japanese Laid-open Utility Model No. 4-104,893 (hereinafter called prior art 3), since a grip is formed in the manipulator of prior art 2, it does not slip off during operation, and the holding position will not be deviated. In prior art 3, however, since the manipulation plane on which operation switches are formed projects ahead (to the player side) of the grip, the player must warp the thumb (in other words, by keeping the thumb root always in a tense state), and the thumb is fatigued and cannot withstand a long use. Besides, since the root of the thumb is always in tense state, the moving range of the thumb is limited, and the feel of manipulation is not comfortable.

SUMMARY OF THE INVENTION

Therefore, a principal object of the present invention is to provide a novel manipulator for a game machine.

Another object of the present invention is to provide a manipulator having good operability.

A manipulator for game machine according to the present invention comprises a first grip selected in a bar shape to be held by a hand of the player, a second grip selected in a bar shape to be held by the other hand of the player, a first operating region located in the thumb area of the player in the upper portion of the first grip, formed in a step so as to be lower than the thumb root position of the player of the first grip, a second operating region located in the thumb area of the player in the upper portion of the second grip, formed in a step so as to be lower than the thumb root position of the player of the second grip, first direction instructing structure provided in the first operating region, second direction instructing structure provided in the second operating region, and coupling structure for coupling the first grip and second grip in a confronting state.

The player holds the first grip by one hand, and holds the second grip by the other hand. In the grip holding state, the thumb of the player draws a spontaneous arc along the step formed between the grip and the operating region, and is positioned on the first and second operating regions.

According to the present invention, the player holds the controller in the grip catching state, and hence can hold the controller more securely as compared with the manipulator in a flat shape held by both palms. It is further structured to be caught easily by the player's hand and fingers, and dropping of the manipulator during use or deviation of a holding position are avoided, thereby allowing continued stable manipulation without having to look at the hands or change the holding position correctly, and misoperation due to deviation of configuration of switches and fingers can be prevented.

Moreover, between the grip and operating region, a step is formed so as to be lower than the thumb root position of the player in the grip, so that the thumb draws a spontaneous arc along the step. As a result, any excessive load is not applied to the thumb, and the player fatigue is less if used for a long time.

Furthermore, according to a fourth aspect of the invention, the front, rear, left and right directions, and upper, lower, right slant and left slant directions can be instructed, so that directions can be instructed in a three-dimensional space.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
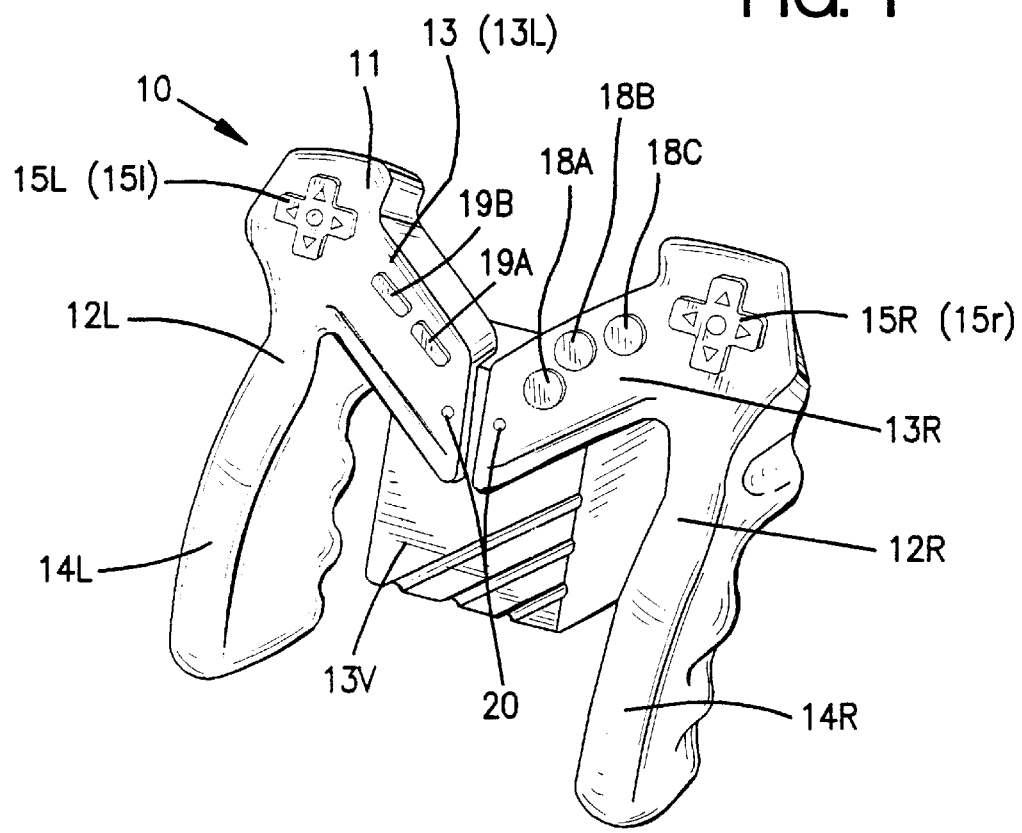
FIG. 1 is a front perspective view of a manipulator for a game machine in an embodiment of the invention.
Figure 2:
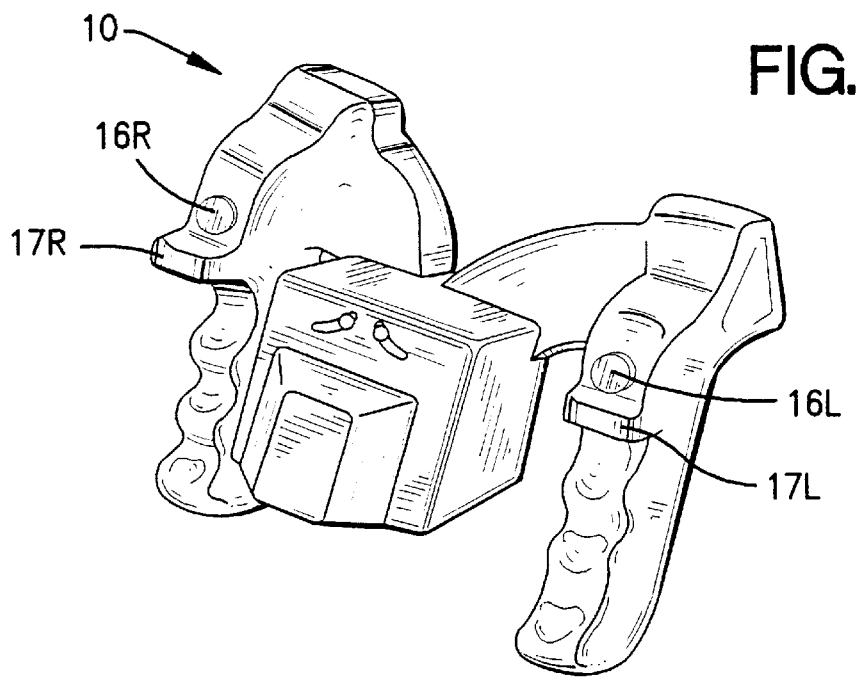
FIG. 2 is a rear perspective view of the embodiment in FIG. 1.

FIG. 1 and FIG. 2 are perspective views showing a manipulator for a game machine in an embodiment of the invention, and specifically FIG. 1 is a perspective view from the front side, and FIG. 2 is a perspective view from the rear side.

In the diagrams, a manipulator for a game machine (hereinafter called controller) 10 contains a housing 11. The housing 11 is roughly composed of a right handle 12R, a left handle 12L, and a coupling 13 for coupling them. Inside the housing 11 is accommodated a board in a proper shape (not shown) in which desired conductive circuit patterns are formed by printed wiring or the like.

The right handle 12R and left handle 12L respectively comprise grips 14R, 14L to be held by the middle, ring and little fingers of the player, and a direction instructing switch for right hand 15R and a direction instructing switch for left hand 15L for instructing the moving direction of characters (hero and others) of the game are disposed in the thumb position area of the player in the upper portions of the grips 14R, 14L. The direction instructing switch for right hand 15R comprises, for example, a cross key top 15r capable of instructing four orthogonal directions, that is, front, rear, left and right directions shown in FIG. 3, and further comprises four pressing pads corresponding to the four directions. The direction instructing switch for left hand 15L comprises, for example, a cross key top 15l capable of instructing four directions, that is, upper, lower, right slant and left slant directions shown in FIG. 4, and further comprises four pressing pads corresponding to the four directions.

The grips 14R, 14L have concave and convex parts to be matched with the fingers of the player when held, and a comfortable feel is realized. In the index finger position areas of the player in the upper portions of the rear side of the grips 14R, 14L (in other words, the rear sides of the locations of the direction instructing means for right hand 15R and direction instructing means for left hand 15L), action instructing switches 16R, 16L (see FIG. 2) are formed. These action instruction switches 16R, 16L differ with the game program, and are used for instructing actions of characters such as "run" and "jump" except for the moving direction. In the boundary areas of the action instructing switches 16R, 16L and grips 14R, 14L, protrusions 17R, 17L are formed, on which the index fingers can be placed when not manipulating the action instructing switches 16R, 16L, and they also function as guides for defining the moving direction of the index fingers at the time of manipulation.

The coupling 13 further comprises a power source unit 13V, a right coupling 13R for coupling the power source unit 13V and right handle 12R, and a left coupling 13L for coupling the power source unit 13V and left handle 12L. A dry cell or a battery is placed in the power source unit 13V, and when a dry cell is used, a battery lid is formed at proper position. When a rechargeable battery is used, an external input terminal for connecting with a commercial AC power source detachably or firmly with a cord or the like is exposed at a position not disturbing the manipulation of the player (for example, in the bottom of the power source unit 13V), and is covered with a lid or the like if necessary. It may be also constituted so that both dry cell and battery can be used.

The AC adapter for converting the commercial AC power source into DC may be either provided externally by using a cord, or incorporated in the power source unit 13V. When it is constituted to supply current through a cord by externally attaching an AC adapter, the overall weight of the controller 10 can be reduced, and hence the fatigue of the arms in long use can be alleviated. Or, when using the controller on a table or the like or the weight may be ignored, the overall weight of the controller 10 may be increased by incorporating the AC adapter, and hence the center of gravity is stabilized to prevent shaking during manipulation, so that stable manipulation may be realized.

In the right coupling 13R, switches 18A, 18B, 18C are formed so as to instruct three actions, different from those of the action instructing switches 16R, 16L, such as "punch," "kick" and "throw." In the left coupling 13L, a start switch 19A for instructing to start the game, and a select switch 19B for selecting the games are formed.

In this embodiment, in order that the switches 18A, 18B, 18C, 19A, and 19B may be arranged within the accessible range of the thumbs, the coupling 13 is coupled near the upper end of the handle 12 in which the direction instructing switch 15 is formed, but as far as the switches 18A, 18B, 18C, 19A, and 19B may be arranged within the accessible range of the thumbs, it is not always necessary to coupling the couple 13 near the upper end of the handle 12. Otherwise, when the operating region for forming the direction instructing switch 15 is wide and the switches 18A, 18B, 18C, 19A, and 19B are arranged in this area, the coupling position of the coupling 13 with the handle 12 is not particularly limited.

The direction instructing switch for right hand 15R and direction instructing switch for left hand 15L comprise cross key tops 15r, 15l as mentioned above. The direction instructing switches including these key tops 15r, 15l are disclosed, for example, in the Japanese Utility Model Publication No. 3-13,951 (U.S. Pat No. 4,687,200). That is, in the lower parts of the key tops 15r, 15l, rubber contacts (not shown) forming four contacts are respectively arranged, and each rubber contact is composed on a board (not shown) in which contact circuits are formed. By pressing any one of a total of eight pressing pads of the key tops 15r and 15l, the four contacts each or eight contacts in all and the contact circuits are electrically connected, and a signal instructing any one or combined direction of eight directions of front, rear, left, right, upper, lower, right slant and left slant directions is picked up, thereby acting as a switch for instructing a three-dimensional direction. The key tops 15r, 15l are put in the housing 11 with the pressing pads exposed, and the board is placed near the bottom of the key tops 15r, 15l in the housing 11.

Figure 3:
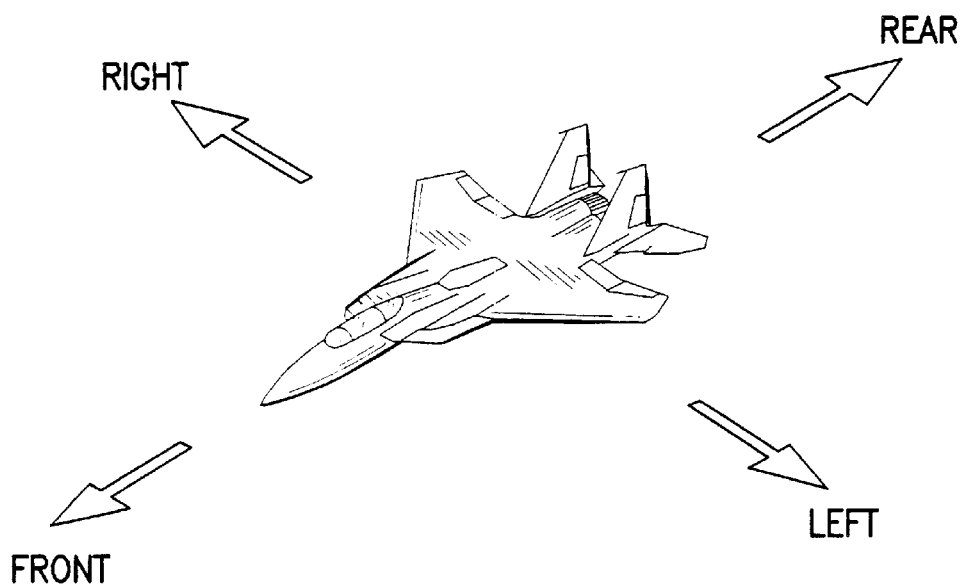
FIG. 3 is a concept diagram showing four moving directions, front, rear, left and right.
Figure 4:
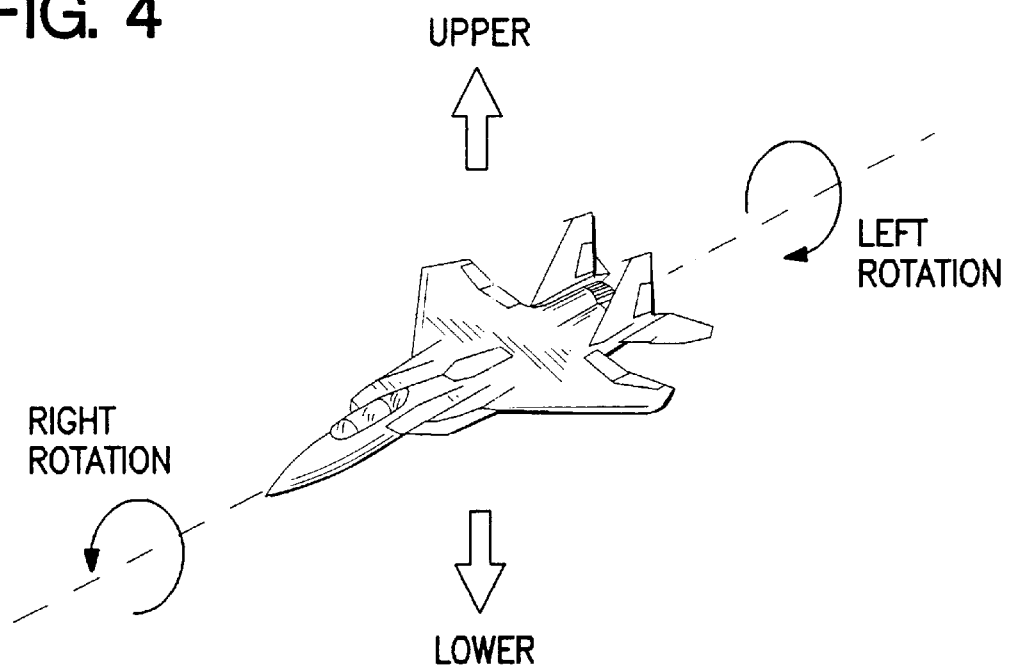
FIG. 4 is a concept diagram showing four moving directions, up, down, right slant and left slant.

Incidentally, if the character manipulated by the controller 10 of the invention is an airplane as shown in FIGS. 3 and 4, its three-dimensional move instructing direction consists of eight directions as mentioned above, but depending on the character in question, the three-dimensional move instructing direction is composed of different combinations, and the combinations are controlled by the game program. As the three-dimensional move instructing directions aside from those mentioned above may include, for example in a human character, eight directions, front, rear, left, right, jump, squat, face right, and face left.

The switches 16R, 16L, 18A, 18B, 18C, 19A, 19B are respectively composed of key tops 16r, 16l, 18a, 18b, 18c, 19a, 19b stored with their pressing pads exposed from the housing 11, rubber contacts (not shown) disposed in the lower part of each key top, and a board (not shown) on which rubber contacts are placed and contact circuits are formed.

Figure 5:
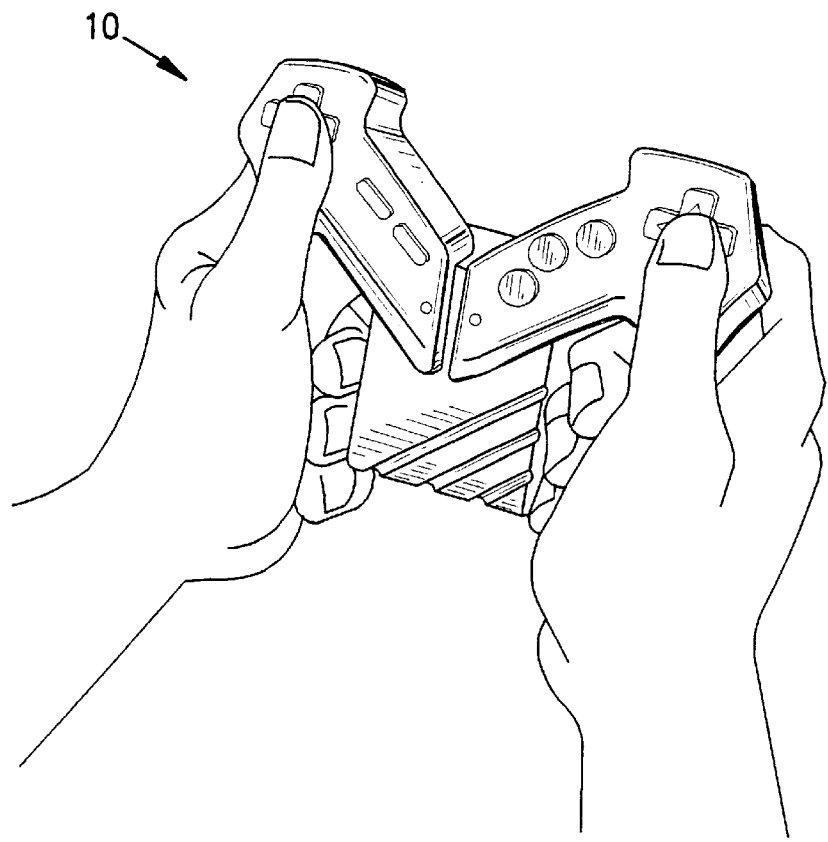
FIG. 5 is a perspective view showing an operation state as seen from the front side in FIG. 1.
Figure 6:
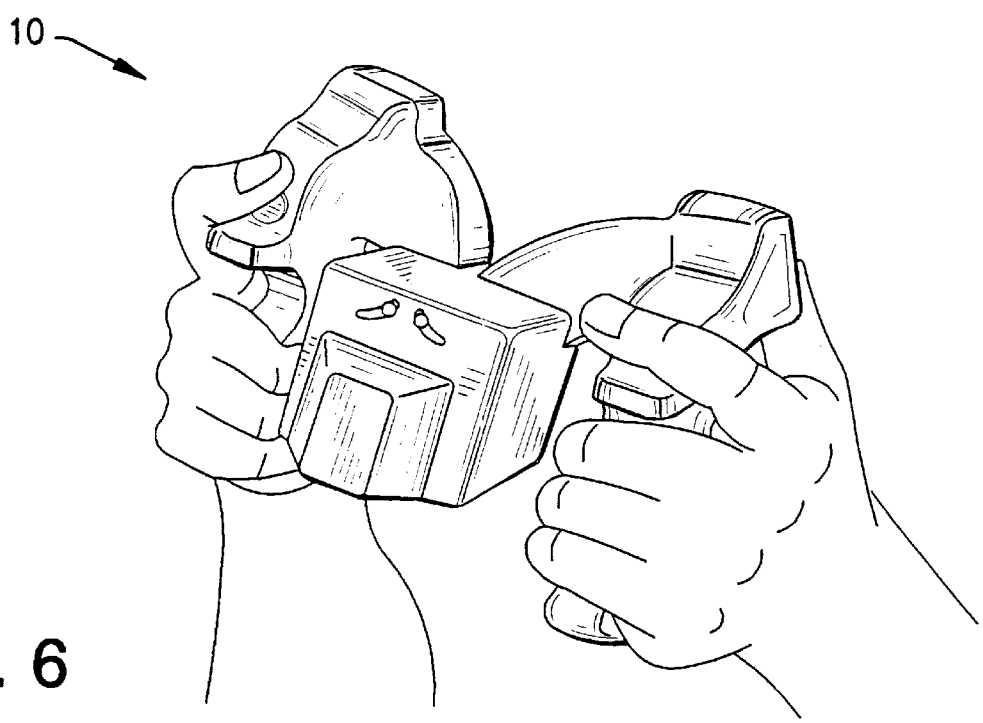
FIG. 6 is a perspective view showing an operation state as seen from the rear side in FIG. 1.

FIG. 5 and FIG. 6 are diagrams showing the operation state of the controller 10 of the invention. The player holds the right grip 14R and left grip 14L by the right hand and left hand, respectively. At this time, the middle, ring and little fingers of the player are curved along the formed convex and concave parts, so that the player can hold the controller 10 firmly. The index fingers are positioned above the protrusions 17R, 17L formed in the upper parts of the grips 14R, 14L, and are used for manipulating the action instructing switches 16R, 16L. Usually, the index fingers rest on the protrusions 17R, 17L, and when manipulating the action instructing switches 16R, 16L, they are moved along the protrusions 17R, 17L. The thumbs are located on the key tops 15r, 15l while gripping the grips 14R, 14L, and the thumb press down the pressing parts by tilting in the desired input direction. As a result, the corresponding contact is connected, and a desired direction instructing signal (pulse signal) is picked up. Besides, by slightly shifting the right thumb to the inside, the action instructing switches 18A, 18B, 18C can be pressed.

Figure 7:
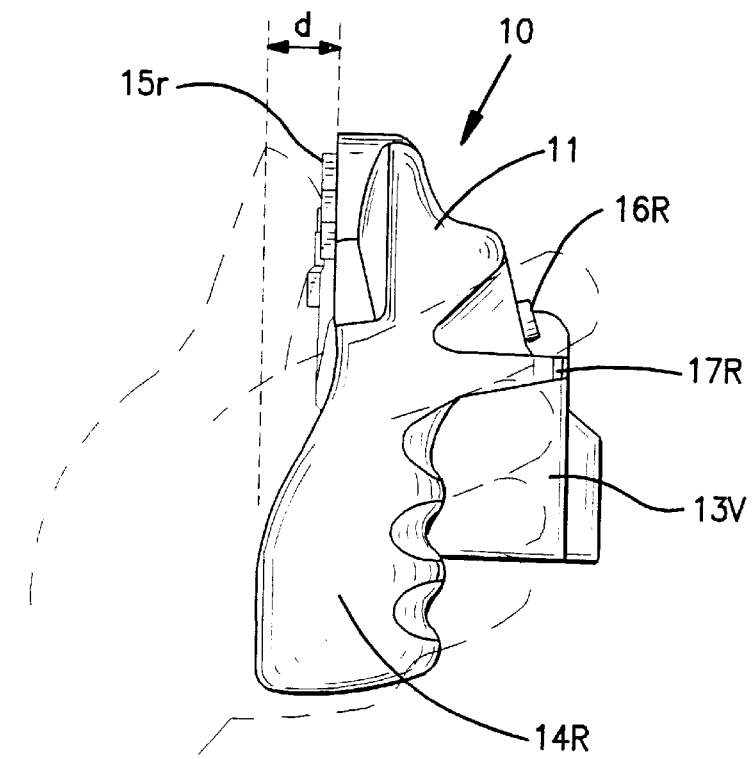
FIG. 7 is a diagram showing an operation state as seen from the side in FIG. 1.

Meanwhile, as shown in FIG. 7, in the controller 10 of the invention, since a step d is provided between the grip 14 and the operating region forming the direction instructing switch 15, when the player holds the controller 10, the thumb draws a spontaneous arc along the step d. Accordingly, the thumb is free to move, without being warped, loaded with an excessive force, or kept always in tense state, so that fatigue is reduced if used for a long time.

More preferably, the interval or opening of the grips 14R, 14L may be freely adjustable depending on the individual difference of the player, by providing a shaft 20 penetrating from the surface of the right coupling 13R and left coupling 13L to the back of the power source unit 13V. Or, relating to the right coupling 13R and left coupling 13L, a gear may be provided to engage with each other, and the right and left sides may be opened or closed simultaneously, or the opening angle may be adjustable in multiple steps.

Figure 8:
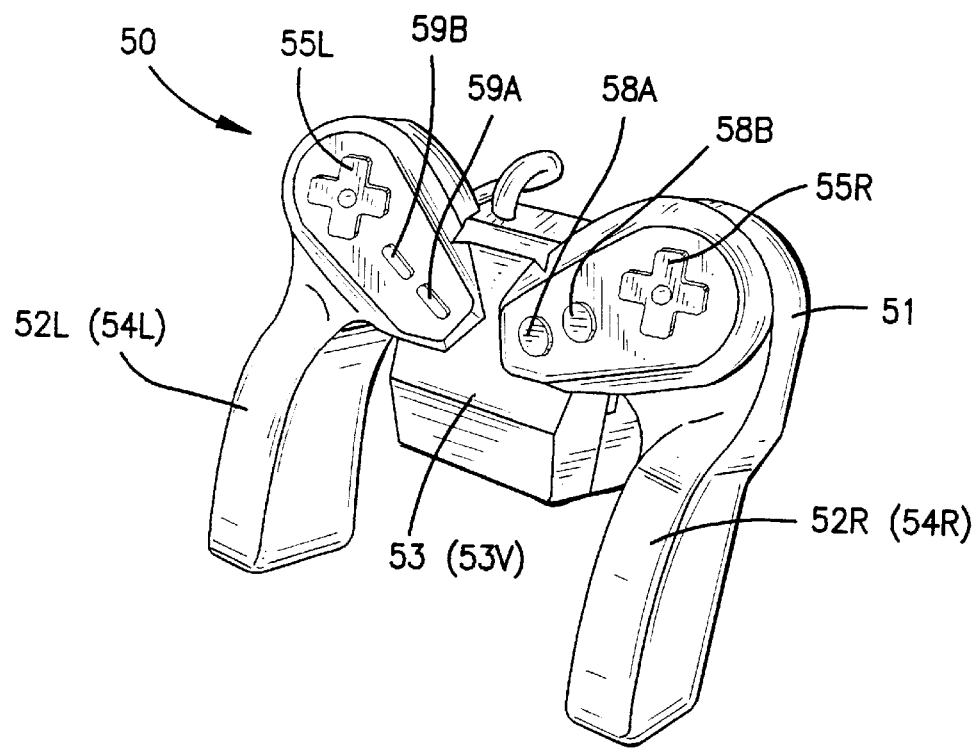
FIG. 8 is a front perspective view of a manipulator for a game machine in another embodiment of the invention.
Figure 9:
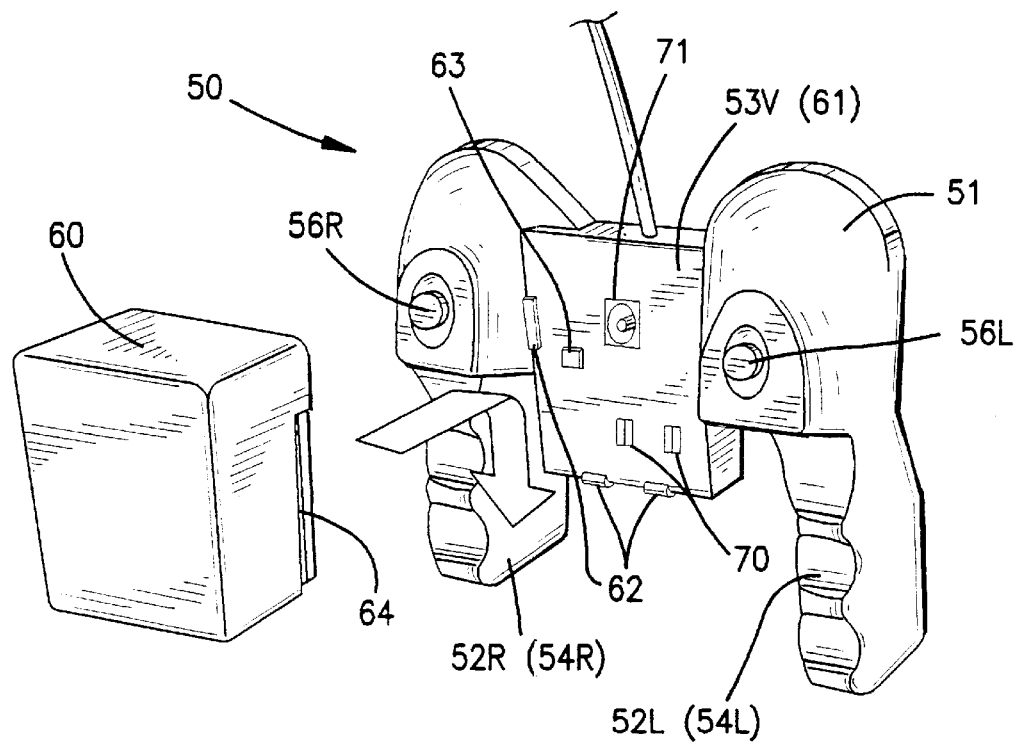
FIG. 9 is a rear perspective view of the embodiment in FIG. 8.

FIG. 8 and FIG. 9 are diagrams showing a manipulator for a game machine in another embodiment of the invention, and specifically FIG. 8 is a perspective view seen from the surface, and FIG. 9 is a perspective view seen from the back side.

A controller 50 in the embodiment in FIG. 8 comprises a housing 51, same as the controller 10 in the embodiment in FIG. 1. The housing 51 is roughly composed of a right handle 52R, a left handle 52L, and a coupling 53 for coupling them. Inside the housing 51 is accommodated a board in a proper shape (not shown) in which desired conductive circuit patterns are formed by printed wiring or the like.

The right handle 52R and left handle 52L respectively comprise grips 54R, 54L, a direction instructing switch for right hand 55R, and a direction instructing switch for left hand 55L, and the direction instructing switches 55R and 55L further comprise cross key tops 55r, 55l.

The grips 54R, 54L have convex and concave parts to match with the fingers of the player, and action instructing switches 56R, 56L are formed in the index finger position areas of the player in the upper parts of the back side of the grips 54R, 54L. In the embodiment in FIG. 1, the index fingers are positioned by forming protrusions 17R, 17L in the boundary parts of the grips 14R, 14L and action instructing switches 16R, 16L; but in the embodiment in FIG. 8, the forming regions of the action instructing switches 56R, 56L are inclined by a certain angle to the grips 54R, 54L and direction instructing switches 55R, 55L, thereby positioning the index fingers so as not to deviate in the direction toward the grips 54R, 54L, and the index fingers are further positioned by forming a recess around the action instructing switches 56R, 56L.

The coupling 53 comprises a power source unit 53V, a right coupling 53R, and a left coupling 53L. In the embodiment in FIG. 8, by widening the operating regions for forming the direction instructing switches 55R, 55L, they serve also as the right coupling 53R and left coupling 53L. The power source unit 53V comprises a power source case 60 detachable from the housing 51, and a base 61 of the housing 51 side for detaching or attaching the power source case 60. A dry cell or a rechargeable battery is placed in the power source case 60. In the base 61, an engaging pawl 62 and an engaging bump 63 are formed for engaging and holding the power source case 60. By contrast, at the power source case 60 side, an engaging groove 64 corresponding to the engaging pawl 62, and an engaging recess (not shown) to be engaged with the engaging bump 63 are formed.

A terminal 70 for electrically connecting with the power source case 60 is formed in the base 61, and terminal 71 for connecting the power cord when not attaching and using the power source case 60 is formed, so that the player may attach and use the power source case 60, or use the power cord, as desired. When the power source case 60 is attached, the terminal 71 for power source cord is covered with the power source case 60 so as not to be exposed.

In the right coupling 53R, action instructing switches 58A, 58B for instructing actions different from the action instructing switches 56R, 56L are formed, and the left coupling 53L forms a start switch 59A and a select switch 59B. The direction instructing switches 55R, 55L, the action instructing switches 56R, 56L, 58A, 58B, start switch 59A and select switch 59B are composed of, same as in the embodiment in FIG. 1, key tops 53r, 53l, 56r, 56l, 58a, 58b, 59a, 59b, rubber contacts (not shown) formed in the lower part of each key top, and the board (not shown) on which rubber contacts are placed and contact circuits are formed.

Figure 10:
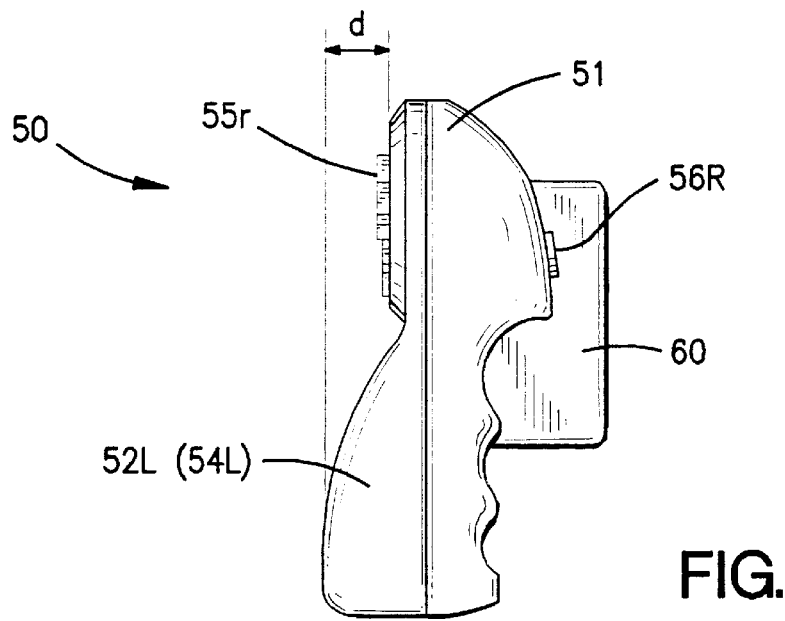
FIG. 10 is a side view of the embodiment in FIG. 8.

Moreover, as shown in FIG. 10, also in the embodiment in FIG. 8, a step d is formed between the grip 54 and the operating region for forming the direction instructing switch 55. Accordingly, when the player holds the controller 50, the thumb draws a spontaneous arc along the step d, and is free to move without being warped, applied with an excessive load, or kept always in a tense state, so that fatigue is reduced if used for a long time.

In the foregoing embodiments of the invention, the move direction instructions in a three-dimensional game are mentioned, but in a game with two-dimensional direction instructions only not requiring three-dimensional direction instructions, the moving direction of the object character may be instructed in one cross key, and the direction of the elements accompanying the character may be instructed in the other cross key. For example, in a game using soldiers as characters, the soldier moving direction is instructed by one cross key, and the firearm direction may be instructed by the other cross key. Furthermore, in an object driven independently in the right and left driving wheels such as a war tank, the left drive wheel may be manipulated by the direction instructing switch for left hand 15L (55L), and the right drive wheel may be manipulated by the direction instructing switch for right hand 15R (55R).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game controller device for use with a video game machine, the game controller device comprising:
    a housing having a first operating region and a second operating region, said first operating region and said second operating region being disposed laterally adjacent each other in a common plane;
    a first operating portion in said first operating region;
    a second operating portion in said second operating region;
    a first set of control members disposed in a first plane of the housing;
    a second set of control members disposed in a second plane of the housing, different from said first plane;
    a first handle integrally formed with said housing and projecting from a lower portion of said first operating region toward a player;
    a second handle integrally formed with said housing and projecting from a lower portion of said second operating region toward the player, said first and second handles being configured to be gripped in left and right hand palms of the player, wherein when the player grips said housing with the left and right hand palms facing each other, said first handle and said second handle are stably held in contact with part of the left and right hand palms, said first operating portion and said second operating portion being arranged for operation by left and right hand thumbs, wherein at least one of said first and second operating portions is for designating a movement direction of an object of a game by the player's operation.

2. A game controller device according to claim 1, wherein said first handle and said second handle have respective front surfaces each assuming an angle relative to a corresponding one of said first and second operating regions, respectively.

3. A game controller device according to claim 2, wherein the respective front surfaces of said first and second handles are formed in an arcuate shape.

4. A game controller device according to claim 2, wherein said first handle and said second handle diverge from said housing.

5. A game controller device according to claim 1, wherein each of said first operating portion and said second operating portion, respectively, comprises switches for designating a movement direction of the object.

6. A game controller device according to claim 5, wherein said movement direction for said first operating portion switch comprises four orthogonal directions, and wherein said movement direction for said second operating portion switch comprises a direction different from that of said first operating portion switch.

7. A game controller device according to claim 1, wherein each of said first operating region and said second operating region, respectively, has cross-shaped recesses at locations corresponding to said first operating portion and said second operating portion.

8. A game controller device according to claim 1, further comprising a third operating region disposed between said first operating region and said second operating region in said housing, wherein said third operating region comprises a start switch for designating start of a game.

9. A game controller device according to claim 8, wherein said first operating portion and said second operating portion have respective centers placed at laterally aligned locations, and wherein said start switch is disposed at a location offset from said first operating portion or said second operating portion.

10. A game controller device according to claim 1, wherein said housing is arranged such that when said housing is placed on an arbitrary plane, said first operating region and said second operating region are disposed substantially parallel with the arbitrary plane.

11. A game controller device according to claim 1, wherein said housing comprises a signal supply portion disposed between said first operating region and said second operating region, said signal supply portion transmitting to a video game machine a signal representative of operating states of said first operating portion and said second operation portion.

12. A game controller device according to claim 1, wherein said housing comprises a connecting terminal portion formed at a back surface thereof, said connecting terminal portion being detachably attached with an external unit, said housing having a detachment-preventing portion formed in part of the back surface to prevent falling off of said external unit.

13. A game controller device for use with a video game machine, comprising:
    a housing having a first operating region and a second operating region, said first operating region and said second operating region being disposed laterally adjacent each other;
    a first operating portion in said first operating region;
    a second operating portion in said second operating region;
    a first set of control members disposed in a first plane of the housing;
    a second set of control members disposed in a second plane of the housing, different from said first plane;
    a first handle integrally formed with said housing and projecting from a lower portion of said first operating region toward a player;
    a second handle integrally formed with said housing and projecting from a lower portion of said second operating region toward the player, said first and second handles being configured to be gripped in left and right hand palms of the player, wherein when the player grips said housing with the left and right hand palms facing each other, said first handle and said second handle are stably held in contact with part of the left and right hand palms, said first operating portion and said second operating portion being arranged for operation by left and right hand thumbs, wherein at least one of said first and second operating portions is for designating a movement direction of an object of a game; and a third operating portion and a fourth operating portion respectively provided in said housing at locations within reach of left and right hand index fingers on a surface different from surfaces of said first operating region and said second operating region.

14. A game controller device according to claim 13, wherein said first handle and said second handle have respective front surfaces each assuming an angle relative to a corresponding one of said first and second operating regions, respectively.

15. A game controller device according to claim 14, wherein the respective front surfaces of said first and second handles are formed in an arcuate shape.

16. A game controller device according to claim 14, wherein said first handle and said second handle diverge from said housing.

17. A game controller device according to claim 13, wherein said movement direction for said first operating portion comprises four orthogonal directions, and wherein said second movement direction for said second operating portion comprises a direction different from that of said first operating portion.

18. A game controller device according to claim 13, wherein said third operating portion and said fourth operating portion are for designating operation other than the movement direction of the object.

19. A game controller device according to claim 13, wherein each of said first operating region and said second operating region, respectively, has cross-shaped recesses at locations corresponding to said first operating portion and said second operating portion.

20. A game controller device according to claim 13, further comprising a third operating region disposed between said first operating region and said second operating region in said housing and a third operating portion in said third operating region, wherein said third operating portion comprises a start switch for designating start of a game.

21. A game controller device according to claim 13, wherein said housing comprises a signal supply portion disposed between said first operating region and said second operating region, said signal supply portion transmitting to a video game machine a signal representative of operating states of said first operating portion and said second operation portion.

22. A game controller device for use with a video game machine, comprising:

a housing having a first operating region and a second operating region, said first operating region and said second operating region being disposed laterally adjacent each other in a common plane, and a third operating region provided between said first operating region and said second operating region;

a first operating portion in said first operating region;

a second operating portion in said second operating region;

a start switch in said third operating region for designating start of a game;

a first set of control members disposed in a first plane of the housing;

a second set of control members disposed in a second plane of the housing, different from said first plane;

a first handle integrally formed with said housing and projecting from a lower portion of said first operating region toward a player, said first handle having a first handle front surface continuous with said first operating region and assuming an angle relative to said first operating region such that the first handle front surface is disposed in a plane different from said common plane;

a second handle integrally formed with said housing and projecting from a lower portion of said second operating region toward the player, said second handle having a second handle front surface continuous with said second operating region and assuming an angle relative to said second operating region such that the second handle front surface is disposed in a plane different from said common plane, said first and second handles being configured to be gripped in left and right hand palms of the player, wherein when the player grips said housing with the left and right hand palms facing each other, said first handle and said second handle are stably held in contact with part of the left and right hand palms, said first operating portion and said second operating portion being arranged for operation by left and right hand thumbs of the player, wherein at least one of said first and second operating portions is for designating a movement direction of an object of a game by the player's operation.

23. A game controller device according to claim 22, wherein the respective front surfaces of said first and second handles are formed in an arcuate shape.

24. A game controller device according to claim 22, further comprising a pause switch provided in said third operating region, said pause switch designating interruption of a game.

25. A game controller device according to claim 22, wherein said first operating portion and said second operating portion have respective centers placed at laterally aligned locations and, and wherein said start switch is disposed at a location offset from said first operating portion or said second operating portion.

* * * * *